US009728299B2

(12) United States Patent
Cade et al.

(10) Patent No.: US 9,728,299 B2
(45) Date of Patent: Aug. 8, 2017

(54) PTFE MATERIAL HAVING AN ANTI-CORONA EFFECT

(75) Inventors: David Cade, Paris (FR); Emmanuel Garraud, Langres (FR)

(73) Assignee: PRODUITS PLASTIQUES PERFORMANTS HOLDING—3P HOLDING, Dardilly (FR)

( * ) Notice: Subject to any disclaimer, the term of this patent is extended or adjusted under 35 U.S.C. 154(b) by 1099 days.

(21) Appl. No.: 13/807,891

(22) PCT Filed: Jun. 30, 2011

(86) PCT No.: PCT/FR2011/051529
§ 371 (c)(1),
(2), (4) Date: Mar. 5, 2013

(87) PCT Pub. No.: WO2012/001313
PCT Pub. Date: Jan. 5, 2012

(65) Prior Publication Data

US 2013/0264090 A1 Oct. 10, 2013

(30) Foreign Application Priority Data

Jul. 2, 2010 (FR) ...................................... 10 55386

(51) Int. Cl.

| | |
|---|---|
| ***B32B 9/00*** | (2006.01) |
| ***H01B 3/44*** | (2006.01) |
| ***H01B 7/02*** | (2006.01) |
| ***H01B 13/08*** | (2006.01) |

(52) U.S. Cl.
CPC ........... *H01B 3/445* (2013.01); *H01B 7/0241* (2013.01); *H01B 13/0891* (2013.01)

(58) Field of Classification Search
USPC ......................................... 524/545, 544, 385
See application file for complete search history.

(56) References Cited

U.S. PATENT DOCUMENTS

| | | | | |
|---|---|---|---|---|
| 2,985,918 A * | 5/1961 | Moore | C08J 9/06 | 264/127 |
| 3,054,761 A * | 9/1962 | Moore | C08J 9/28 | 264/127 |
| 3,577,346 A | 5/1971 | McKeown et al. | | |
| 4,493,873 A | 1/1985 | Keane et al. | | |
| 4,537,804 A | 8/1985 | Keane et al. | | |
| 5,861,578 A | 1/1999 | Hake et al. | | |
| 6,337,442 B1 | 1/2002 | Lienert et al. | | |
| 2003/0152750 A1* | 8/2003 | Schwamborn | B29C 55/005 | 428/192 |
| 2004/0031620 A1 | 2/2004 | Lerchenmueller et al. | | |
| 2005/0199414 A1* | 9/2005 | Kim | H01B 9/006 | 174/110 R |
| 2008/0145664 A1* | 6/2008 | Sirovatka | A61K 8/0208 | 428/411.1 |
| 2009/0230585 A1* | 9/2009 | Thottupurathu | B01D 67/0079 | 264/175 |

FOREIGN PATENT DOCUMENTS

| | | | |
|---|---|---|---|
| CN | 1141640 | A | 1/1997 |
| CN | 1382740 | A | 12/2002 |
| CN | 101253579 | A | 8/2008 |
| CN | 101518951 | A | 9/2009 |
| CN | 101519499 | A | 9/2009 |
| CN | 101705059 | A | 5/2010 |
| EA | 200702572 | A1 | 8/2008 |
| EP | 1 775 101 | A1 | 4/2007 |
| EP | 1775101 | A1 * | 4/2007 |
| RU | 2132993 | C1 | 7/1999 |
| RU | 2304513 | C2 | 8/2007 |
| WO | 95/12087 | A1 | 5/1995 |
| WO | 2006127711 | A3 | 5/2007 |

OTHER PUBLICATIONS

International Search Report issued in International Patent Application No. PCT/FR2011/051529 dated Mar. 9, 2012.
Written Opinion of the International Searching Authority issued in International Patent Application No. PCT/FR2011/051529 mailed Mar. 9, 2012 (with translation).
Oct. 9, 2014 Search Report issued in Chinese Application No. 2011800332660.
Jul. 28, 2015 Decision on Grant Patent for Invention issued in Russian Patent Application No. 2012156264/04.

* cited by examiner

*Primary Examiner* — Mark Kaucher
*Assistant Examiner* — Henry Hu
(74) *Attorney, Agent, or Firm* — Joel S. Armstrong

(57) ABSTRACT

The present invention provides a material based on high density polytetrafluoroethylene (PTFE) and its applications, such as in the production of electric cable. The PTFE material of the invention includes PTFE, a metal oxide, a lubricant and a wetting agent.

12 Claims, No Drawings

PTFE MATERIAL HAVING AN ANTI-CORONA EFFECT

FIELD OF THE INVENTION

The present invention relates to a material based on polytetrafluoroethylene (PTFE) and to its applications, such as the production of electric cables.

BACKGROUND OF THE INVENTION

Recent developments in the aviation industry have contributed to a considerable increase in the amount of electrical equipment on board aircraft. Further, the appearance of large-capacity aircraft and the desire to limit the impact of flights on the environment have urged aircraft manufacturers to look for ways of minimizing the weight of said aircraft.

Concerning the electric cables used in aircraft, such tendencies have given rise to the production of cables that are capable of transmitting ever higher voltages without, if possible, modifying their weights or dimensions. Under such conditions, the consequence of increasing the voltage is to generate a phenomenon of partial electric discharges in the cables by avalanche ionization of the air. In this phenomenon, when electrons are subjected to an intense electrical field, they acquire sufficient energy to cause the ionization of neutral molecules (for example the molecules of the gases constituting the air) and thus create new free electrons, which are also capable of ionizing other neutral molecules. When the voltage is sufficient, an electric arc is produced.

Said phenomenon, also known as the corona effect, is influenced by various factors such as the nature and the temperature of the material in which the discharge occurs and the pressure of the ambient air. When the pressure of the air drops, the voltage at which discharge appears also drops. An airplane generally flies at an average altitude of 10 000 meters, where the pressure is approximately 200 hPa [hectoPascal] to 300 hPa. Thus, flight conditions favor the appearance of the corona effect.

When a partial discharge occurs in a cable comprising a conductive core covered with an insulating material, that material is subjected to various stresses:

- a thermal stress due to a local increase in the temperature in the zone where the partial discharge occurs;
- chemical stresses due to the generation of ozone and nitric acid during the partial discharge; and
- mechanical stresses due to erosion of the surface of the material and enlargement of pores within it.

Said stresses all cause deterioration of the material, from simple premature aging to the appearance of cracks.

Patent application US 2004/0031620 describes an electric cable in which the insulating material surrounding the conductive core is a matrix based on polyamideimide or polyesterimide to which a metal oxide, titanium dioxide, has been added. That material can prevent the corona effect.

However, certain applications require the use of a material having both electrical insulation properties and good temperature resistance, such as PTFE.

Unfortunately, it has not yet been possible to introduce metal oxides (also known as fillers) such as titanium dioxide into extruded PTFE in quantities that allow an anti-corona effect to be obtained. An introduction of that type gives rise to major difficulties:

- the presence of fillers in the PTFE has the result of rendering the PTFE porous, resulting in a low density PTFE material being obtained. However, in order not to encourage the corona effect, it is necessary to limit the quantity of air present in the material and, as a consequence, to minimize the number of pores present therein; and
- the presence of a filler in PTFE also gives rise to problems during extrusion of the material, such as an increase in the extrusion pressure or the risk of breakage during calendering. Such phenomena may be avoided by adding lubricant to the composition. However, during the drying step, the lubricant also has a tendency to create pores in the material in which it is incorporated, which then results in a low-density material.

OBJECT AND SUMMARY OF THE INVENTION

The inventors' studies have led them to the development of a novel material based on polytetrafluoroethylene and metal oxide, having an anti-corona effect that overcomes the above-mentioned difficulties.

Thus, the present invention provides a material based on polytetrafluoroethylene (PTFE) of normal density prepared from a mixture comprising:

- PTFE;
- 5% to 15% by weight of a metal oxide, preferably 5% to 12% by weight, still more preferably 5% to 10% by weight;
- 15% to 30% by weight of a lubricant, preferably 20% to 27% by weight; and
- 0.1% to 1% by weight of a wetting agent, preferably 0.3% to 0.7% by weight;

the percentages by weight being given relative to the total weight of PTFE.

The term "PTFE" means an unmodified or modified PTFE. The term "modified" refers to a branched PTFE wherein the branch is bonded to the carbon chain of the PTFE via an oxygen atom.

The term "normal density" means a material based on PTFE with a density of more than 1.45.

The term "metal oxide" principally means oxides of alkaline-earth metals, transition metals, and poor metals. Advantageously, the metal oxide is selected from the group constituted by titanium dioxide, alumina, zinc oxide, copper oxide, magnesium oxide, and silver oxide.

Once extruded, the PTFE material as prepared above has the following composition:

- PTFE;
- 5% to 15% by weight of a metal oxide, preferably 5% to 12% by weight, still more preferably 5% to 10% by weight; and
- traces of a lubricant and/or a wetting agent;

the percentages by weight being given relative to the total weight of PTFE.

Preferably, the lubricant is a hydrocarbon-based liquid such as an isoparaffinic hydrocarbon, in particular Isopar™, and the wetting agent is a fatty alcohol, advantageously dodecan-1-ol. The wetting agent can provide the PTFE with better miscibility with the fillers and thus promotes the production of a homogeneous mixture.

Isopar™ (Exxon Mobil Chemical) is a high-purity mixture of synthetic isoparaffinic hydrocarbons.

The material of the invention can thus be used to dissipate the electrons created during partial discharge (anti-corona effect). The percentages chosen for the metal oxide and for the lubricant, together with the presence of a wetting agent, can result in a final high-density PTFE material. In addition, this material may be prepared by extrusion.

Advantageously, the grain size and the specific surface area of the metal oxide particles should be controlled. The grain size should preferably be in the range 10 nm [nanometer] to 1 μm [micrometer], preferably in the range 150 nm to 500 nm. Similarly, metal oxide particles with a specific surface area in the range 3 $m^2/g$ [square meter per gram] to 200 $m^2/g$, preferably in the range 5 $m^2/g$ to 50 $m^2/g$, are preferred.

In one embodiment of the invention, the material also comprises 0 to 3% by weight of a pigment.

For an application in the field of electric cables, the material of the invention is in the form of a tape, generally several kilometers long and 3 mm [millimeter] to 400 mm in width after extrusion and trimming. When offered for sale, the width of the tape is advantageously 5 mm to 30 mm.

The invention also provides a process for producing a PTFE material as described above, comprising the steps consisting in:

- mixing the PTFE, the metal oxide, the lubricant, the wetting agent and the optional pigment; and
- extruding the product resulting from the mixing step.

Preferably, the above-described mixing step is carried out in two stages. The process thus comprises the following steps, consisting in:

- preparing a first mixture comprising the metal oxide and the powdered PTFE;
- preparing a second mixture comprising the lubricant, the wetting agent and the optional pigment;
- spraying the second mixture onto the first mixture;
- homogenizing and then screening the resulting product; and
- extruding the resulting product.

This process can be used to obtain a more homogeneous product since it limits aggregates considerably. During the subsequent calendering step, the presence of aggregates in the material is a critical element because the final tape obtained must be very thin, of the order of 50 μm to 200 μm in thickness.

As mentioned above, the process in general comprises two additional steps after extrusion:

- calendering; and
- drying.

Calendering is carried out at a pressure of more than 150 bar and drying at a temperature of 130° C. to 230° C.

The tape may be delivered uncured when it is intended to be used as a starting material, or cured when it has already been formed into the finished product. The curing step is carried out in an oven at a temperature of less than 450° C., preferably less than 400° C.

Finally, the invention provides the various uses of the material of the invention.

In accordance with a first use, the material of the invention is an electrical insulator, particularly suitable for the production of electric cables. In particular, the characteristics of this material make it a material of choice for applications in the aviation field.

Thus, the invention provides an electric cable comprising a tape formed from a material of the invention wound around a conductive core.

The term "conductive core" means a strand that allows conduction, such as a strand of copper or alumina several millimeters in diameter, optionally treated with silver to improve the conductivity.

The same cable may include one or more conductive cores. They may be surrounded by a polyimide film, for example Kapton® (Dupont), before winding with one or more tapes of the invention.

Advantageously, the cable may be prepared by means of a process comprising the steps consisting in:

- winding a tape around a conductive core; and
- curing the cable at a temperature of less than 450° C., preferably less than 400° C.

In accordance with a second use, the material of the invention is used as an electrical insulator, in particular in the aviation field. In fact, in addition to its anti-corona effect, the material of the invention advantageously has heat resistant properties.

The invention can be better understood from the following example, given purely by way of illustration.

EXAMPLE 1

Comparison of Two Formulations of PTFE Material

Formulations:

| | Formulation 1 | Formulation 2 |
|---|---|---|
| PTFE powder (kg) | 10 | 10 |
| Filler | ZnO | $Al_2O_3$ |
| Quantity of filler (kg) | 1 | 1 |
| Grain size (nm) | 500 | 100 |
| Specific surface area ($m^2/g$) | 15 | 10 |
| Isopar™ (kg) | 2.5 | 2.9 |
| Density (in finished product) | 1.5 | 1.38 |

Production Process:

The process comprises three steps:

- mixing;
- extrusion/calendering;
- trimming/packaging.

Mixing: the metal oxide and the PTFE powder are mixed in order to constitute the first mixture. Advantageously, this first mixture is screened to avoid the presence of aggregates. The lubricant (Isopar), the wetting agent and the optional pigments are then mixed to form a second mixture. The second mixture is then sprayed over the first mixture and the resulting product is then mixed again and screened to make it homogeneous.

Extrusion/calendering: the product is then compacted to produce a preform, in general a cylinder 30 cm [centimeter] high and 10 cm in diameter. These preforms are then extruded and calendered to obtain a tape of the desired thickness (for example 76 μm). This tape is then fed into an oven to evaporate off the lubricant, and is wound onto a reel.

Trimming/packaging: this final step can be used to package the tape (for example coiled or on a universal reel).

The tape may be delivered to clients uncured. When used on the cable, it undergoes a heat treatment at a maximum temperature of 450° C., preferably 380° C.

CONCLUSION

Example 1 can be used to obtain a tape that can be used, in contrast to Example 2. The tape of Example 2 had a tacky texture (delamination) and its density was non-homogeneous.

The invention claimed is:

1. A material based on polytetrafluoroethylene (PTFE), the material having a density of more than 1.45 and being prepared from a mixture comprising:

PTFE;

5% to 15% by weight of metal oxide particles;

15% to 30% by weight of a lubricant; and 0.1% to 1% by weight of a wetting agent;

the percentages by weight being based on the weight of PTFE, wherein the wetting agent is a fatty alcohol and the metal oxide particles have a grain size in the range of 10 nm to 1 μm.

2. The material according to claim 1, wherein the lubricant is a liquid based on hydrocarbons.

3. The material according to claim 2, wherein the lubricant is a liquid based on an isoparaffinic hydrocarbon.

4. The material according to claim 1, wherein the wetting agent is dodecan-1-ol.

5. The material according to claim 1, wherein the grain size is in the range of 150 nm to 500 nm.

6. The material according to claim 1, wherein the metal oxide is selected from the group consisting of titanium dioxide, alumina, zinc oxide, copper oxide, magnesium oxide and silver oxide.

7. The material according to claim 1, further comprising 0 to 3% by weight of a pigment.

8. The material according to claim 1, in the form of a tape.

9. A process for producing the material according to claim 1, the process comprising:

mixing the PTFE, the metal oxide particles, the lubricant, the wetting agent and an optional pigment; and extruding the resulting product.

10. An electric cable comprising the material according to claim 8 wound around a conductive core.

11. A process for producing the electric cable according to claim 10, the process comprising:

winding the tape around the conductive core; and curing at a maximum temperature of 450° C.

12. An electrical insulator comprising the material according to claim 1.

* * * * *